(12) United States Patent
Aiba et al.

(10) Patent No.: US 6,667,104 B2
(45) Date of Patent: Dec. 23, 2003

(54) PHENOL RESIN COMPOSITION FOR WET FRICTION MATERIAL AND WET FRICTION MATERIAL

(75) Inventors: Hiroshi Aiba, Tokyo (JP); Masahiro Mori, Fukuroi (JP)

(73) Assignees: Sumitomo Bakelite Company Limited, Tokyo (JP); NSK-Warner K.K., Tokyo (JP)

( * ) Notice: Subject to any disclaimer, the term of this patent is extended or adjusted under 35 U.S.C. 154(b) by 0 days.

(21) Appl. No.: 10/160,090

(22) Filed: Jun. 4, 2002

(65) Prior Publication Data

US 2003/0031880 A1 Feb. 13, 2003

(30) Foreign Application Priority Data

Jun. 4, 2001 (JP) .................................... 2001-168231

(51) Int. Cl.$^7$ .................................................. B32B 9/00
(52) U.S. Cl. .................. 428/447; 525/477; 525/478; 528/31; 528/86; 528/212; 528/214
(58) Field of Search ................... 428/447, 413; 525/477, 478; 528/31, 86, 212, 214

(56) References Cited

U.S. PATENT DOCUMENTS 5,834,551 A * 11/1998 Haraguchi et al. .......... 524/492

FOREIGN PATENT DOCUMENTS

| JP | 8-259782 | 10/1996 |
| JP | 2000-336177 | 12/2000 |

OTHER PUBLICATIONS

Machine Translation, JP 2000–336177A, Tomoda et al., published May 12, 2000.*

* cited by examiner

Primary Examiner—Robert Dawson
Assistant Examiner—Christopher M Keehan
(74) Attorney, Agent, or Firm—Oblon, Spivak, McClelland, Maier & Neustadt, P.C.

(57) ABSTRACT

A phenol resin composition for wet friction material comprising a curable resin composition obtained by mixing a resol-type phenol resin and a hydrolysis solution of an alkoxysilane or a condensate thereof, wherein the ratio by weight of the nonvolatile components of the resol-type phenol resin (R) and the nonvolatile components of the hydrolysis solution of the alkoxysilane or the condensate thereof (S), obtained after heat-treatment at 135° C. for one hour, is in the range of 64/36 to 10/90.

7 Claims, No Drawings

PHENOL RESIN COMPOSITION FOR WET FRICTION MATERIAL AND WET FRICTION MATERIAL

BACKGROUND OF THE INVENTION

1. Field of the Invention

The present invention relates to a wet friction material used in oil, particularly in an automatic transmission fluid (ATF), and to a phenol resin composition for the wet friction material used as a binder for the wet friction material.

2. Description of Background Art

Since wet friction materials for automatic transmissions for automatic vehicles are used in oil, the material must be thoroughly impregnated with oil. Such a wet friction material is therefore made from a porous material. A commonly used wet friction material is prepared by impregnating a paper body made of a fibrous material with a phenolic resin diluted in an organic solvent, followed by drying and heat-curing steps. As a phenolic resin, a resol-type phenol resin using an organic solvent such as an alcohol and ketone as a solvent is commonly used due to excellent heat resistance and excellent adhesion with the fibrous material. As a fibrous material, wood pulp, cotton lint, aramid fiber, and the like can be given. For preparing the paper body, fillers such as a friction-adjusting agent, solid lubricant, and the like are added as appropriate.

In recent years, downsizing and lightening of automatic transmissions are progressing aiming at a low fuel consumption in view of energy saving and environment protection. For this reason, miniaturization and a decrease in the number of wet friction materials used for the automatic transmissions are desired. Because the torque capacity is insufficient if conventional wet friction materials are used, an increase in the coefficient of friction is desired. If the coefficient of friction is increased, the materials generate a greater heat of friction. Therefore, improvement in durability of the wet friction materials is desired. The durability of wet friction materials is expressed by a permanent cycle number (life of the wet friction material) until the friction material exfoliates and the total thickness changes for the wet friction material itself. Therefore, three parameters, i.e. an increase in the coefficient of friction, an increase in the number of permanent cycles, and decrease of the total thickness change, are strongly desired for wet friction materials. Similarly, binders contributing to these three parameters are desired.

As a material for satisfying this requirement, Japanese Patent Application Laid-open No. 1996-259782 discloses a composite material consisting of a heat-curable resin and a metal oxide, a method of manufacturing such a composite material, and the like. The manufacturing method comprises hydrolyzing and poly-condensing a metal alkoxide containing a silicon alkoxide or its low condensate in a solution of a heat-curable resin containing a phenol resin, while removing the solvent or curing the resin, whereby a composite material with metal oxide particles having an average particle size of 0.01 to 5 μm homogeneously dispersed in the heat-curable resin in the amount of 1 to 35 wt % in such a manner that no macro-phase separation may occur can be obtained. Among numerous applications of the composite material, the use as a friction material is mentioned. Japanese Patent Application Laid-open No. 2000-336177 discloses a wet friction material made by impregnating a paper substrate with a heat-curable resin. The patent application describes that this wet friction material exhibits an improved strength without decreasing porosity due to either a three-dimensional network structure of $SiO_2$ or dispersed $SiO_2$ particles in the heat-curable resin. A mixture of a hydrolysis solution of tetraalkoxysilane and a phenol resin is used as a binder for the wet friction material in the examples. Materials containing $SiO_2$ in the amount of 24.5 to 26.7 wt % in the resins and the like are given as examples.

As conventional composite materials of heat-curable resin and metal oxide have improved sliding characteristics such as particularly controlled friction characteristics, a high limit PV value, and low wearing characteristics, but do not necessarily possess a high coefficient of friction as a binder for wet friction materials, further improvement was desired. In addition, the content of $SiO_2$ in the $SiO_2$-containing heat-curable resin is no more than 30 wt %, which is not necessarily sufficient for ensuring a high coefficient of friction, an increased number of permanent cycles, and a decrease in the total thickness change.

Accordingly, an object of the present invention is to provide a phenol resin composition for wet friction material which can satisfy the requirements for a high coefficient of friction, a decrease in the total thickness change, and an increased number of permanent cycles until the friction material is peeled off at the same time, as well as a wet friction material. Another object of the present invention is to improve the storage stability of the phenol resin composition and improve usability of the phenol resin composition as a binder for wet friction material.

SUMMARY OF THE INVENTION

Specifically, the present invention provides a phenol resin composition for wet friction material comprising a curable resin composition obtained by mixing a resol-type phenol resin and a hydrolysis solution of an alkoxysilane or a condensate thereof, wherein the ratio (R/S) by weight of the nonvolatile components of the resol-type phenol resin (R) and the nonvolatile components of the hydrolysis solution of the alkoxysilane or the condensate thereof (S), obtained after heat-treatment at 135° C. for one hour, is in the range of 64/36 to 10/90.

The present invention also provides a wet friction material in which the above phenol resin composition for wet friction material is used as a binder.

The present invention further provides a wet friction material product with the above wet friction material attached to one or both sides of a core material using an adhesive.

DETAILED DESCRIPTION OF THE INVENTION AND PREFERRED EMBODIMENTS

The present invention will be described in detail below. The phenol resin composition for wet friction material of the present invention is a liquid resin composition which is a binder precursor for a wet friction material. Although not specifically limited, the resol-type phenol resin used in the present invention can be prepared by mixing a phenol compound (P) and an aldehyde compound (A) at a molar ratio of A/P=0.8 to 1.4, preferably 0.9 to 1.3, reacting the mixture in the presence of an alkali catalyst, removing water by distillation under reduced pressure to a water content of 10 wt % or less, and dissolving the resulting product in alcohol. The product with a molar ratio of more than 1.4 has such a large cross-linking density that when the product is used in a wet friction material, the total thickness change may unacceptably increase. If the molar ratio is less than 0.8, phenol compounds may remain unreacted, resulting in a decreased yield of the resin. The number average molecular weight of the resol-type phenol resin is preferably from 150 to 400, and particularly preferably from 180 to 350. If the number average molecular weight is less than 150, monomers may remain unreacted, resulting in a decreased yield of the resin. If the number average molecular weight is more than 400, the fibrous material is impregnated with the resin only with difficulty and the resin exhibits impaired adhesion with the fibrous material, resulting in a composite material in which the number of permanent cycles under high surface pressure can be improved only with difficulty when used as a wet friction material. Here, the number average molecular weight is a polystyrene-reduced number average molecular weight measured by using HPLC. Because the resol-type phenol resin of the present invention can be obtained by the above method, the resin may be used in the form containing an alcohol and a small amount of water when preparing an impregnation solution by mixing it with the hydrolysis solution of an alkoxysilane or a condensate thereof, described later in this specification.

There are no specific limitations to the phenol compound (P) used in the present invention. Phenol, cresol, xylenol, m-cresol, m-ethyl phenol, resorcin, catechol, hydroquinone, bisphenol A, and the like can be given as examples. These compounds may be used either individually or in combination of two or more. Although there are no specific limitations to aldehyde compounds (A) used in the present invention, formaline, paraformaldehyde, trioxane, acetoaldehyde, and benzaldehyde can be given as examples. These aldehyde compounds may be used either individually or in combination of two or more.

Although there are no specific limitations to alkoxysilanes used in the present invention, an alkoxysilane having two or more hydrolyzable alkoxy groups in the molecule can be used. Specific examples are tetramethoxysilane, tetraethoxysilane, methyltrimethoxysilane, methyltriethoxysilane, dimethyldimethoxysilane, dimethyldiethoxysilane, phenyl trimethoxysilane, phenyltriethoxysilane, diphenyl dimethoxysilane, and diphenyldiethoxysilane. Although there are no specific limitations to the alkoxysilane condensates, a condensate with an average degree of polymerization of about 4 to 5 in the form of a liquid with excellent storage stability is preferably used. Specifically, condensates slightly condensed to the extent that the liquid storage stability is sufficiently maintained are desirable. Specific examples include condensates of tetraethoxysilane ("Ethylsilicate 40", "Ethylsilicate 48" manufactured by Colcoat Co., Ltd.), a condensate of tetramethoxysilane ("Methylsilicate 51" manufactured by Colcoat Co., Ltd.), and the like. These alkoxysilane condensates may be used either individually or in combination of two or more.

Although there are no specific limitations to the hydrolysis solution of an alkoxysilane or a condensate thereof used in the present invention, such a hydrolysis solution is typically obtained by charging a reaction vessel such as a flask equipped with a stirrer with an alkoxysilane or a condensate thereof, an alcohol, water, and an acid and reacting the mixture for 1–5 hours at room temperature to 50° C. The alcohol used herein includes, but is not limited to, methanol, ethanol, isopropanol, and butanol. These alcohols may be used either individually or in combination of two or more. The alcohol must be added in an amount sufficient to obtain a clear, homogeneous solution. The amount of water added is preferably 80 to 250% of the theoretical amount of water (100%) necessary for ultimately gelling all the hydrolyzable alkoxysilane groups after hydrolysis and condensation. If the amount of water is too small, a sufficient hydrolysis reaction will not occur; if too large, storage stability of the hydrolysis solution is decreased. Water may be added either at one time or in several portions. Although there are no specific limitations to the acid, a diluted aqueous solution of hydrochloric acid, sulfuric acid, or nitric acid with a concentration of about 1 N is used. These acids may be used either individually or in combination of two or more. The acid is used in an amount of about 30 g (as a 1 N aqueous solution) or less for 1 kg of alkoxysilane or its condensate. A mixture of alkoxysilane or its condensate may be used as a material for hydrolysis.

The resin composition of the present invention is a fluid mixture of a resol-type phenol resin and a hydrolysis solution of an alkoxysilane or a condensate thereof. The resol-type phenol resin and the hydrolysis solution of an alkoxysilane or a condensate thereof are mixed at a proportion so that the ratio by weight of the nonvolatile components of the resol-type phenol resin (R) and the nonvolatile components of the hydrolysis solution of the alkoxysilane or the condensate thereof (S), obtained after heat-treatment at 135° C. for one hour, may be in the range of R/S=64/36 to 10/90, and preferably 60/40 to 10/90. Specifically, the resol-type phenol resin containing an alcohol and the like and the hydrolysis solution of an alkoxysilane or its condensate are respectively treated with heat at 135° C. for one hour to determine their respective nonvolatile components. The proportion of the resol-type phenol resin and the hydrolysis solution of alkoxysilane or its condensate is determined so that the ratio R/S is in the above range. If the proportion of the nonvolatile components originating from the hydrolysis solution of alkoxysilanes is less than 36 wt % in all nonvolatile components, the wet friction material may not have a sufficiently improved number of permanent cycles; if more than 90 wt %, the total thickness change of the wet friction material tends to become large.

Although there are no specific limitations to the method of mixing the resol-type phenol resin and the hydrolysis solution of an alkoxysilane or a condensate thereof, a typical method is dripping a homogeneous hydrolysis solution of an alkoxysilane or its condensate into a prescribed amount of solution of the resol-type phenol resin in an alcohol, while the latter is stirred, until a prescribed amount of the hydrolysis solution is added, affording a homogeneous solution. The amount of nonvolatile components in the mixed solution may be adjusted by adding an alcohol during preparation of the mixture so that a prescribed amount of resin composition may be attached to the paper body of wet friction material. The content of the nonvolatile components in the liquid resin composition of the present invention is preferably 10 to 45 wt % to ensure superior storage stability and to cause the paper body to be homogeneously impregnated with the resin composition.

The phenol resin composition of the present invention for wet friction material is preferably adjusted to pH 2.0 to 4.5, and more preferably to 2.5 to 3.5, by the addition of an acid. If the pH is outside the above range, the storage stability of the liquid phenol resin composition is so impaired that the resin composition may not be industrially used. The acid may be added either when mixing the resol-type phenol resin and the hydrolysis solution of an alkoxysilane or its condensate or may be previously added to the phenol resin. The acids which can be used include, but are not limited to, hydrochloric acid, sulfuric acid, nitric acid, p-toluene sulfonic acid, formic acid, acetic acid, and lactic acid. The pH of the phenol resin in the present invention indicates the pH value determined for a 1:1 mixture (by weight) of the phenol resin and purified water at 25° C.

A silane coupling agent or a hydrolyzate solution thereof is preferably added to the resin composition of the present invention to improve adhesion of the substrate and binder in the ultimately obtained wet friction material and to improve adhesion of the phenol resin and silicon oxide in the binder. Although there are no specific limitations to the type of silane coupling agent, at least one of the silane coupling agents of the following formula (1) or its hydrolyzate solution is used.

$$Y-(CH_2)_n-SiX_2Z \qquad (1)$$

wherein X is a methoxy group or an ethoxy group, Y represents an amino group, ureido group, mercapto group, aminoethylamino group, 2,3-epoxypropoxyl group, 3,4-epoxycyclohexyl group, or anilino group, Z is a methoxy group, ethoxy group, or methyl group, and n indicates an integer from 1 to 3.

Specific examples are γ-glycidoxypropyltrimethoxy silane (A-187, manufactured by Nippon Unicar Co., Ltd.), β-(3,4-epoxycyclohexyl)ethyltrimethoxysilane (A-186, manufactured by Nippon Unicar Co., Ltd.), γ-aminopropyl triethoxysilane aqueous solution (A-1106, manufactured by Nippon Unicar Co., Ltd.), and the like. The amount of the silane coupling agent is preferably 0.1 to 10 wt % of the phenol resin composition.

The wet friction material of the present invention contains the nonvolatile components originating from the above liquid phenol resin composition as a binder, and usually comprises a fibrous material, a filler, a friction adjustment agent, and the binder. Specifically, the wet friction material is prepared by preparing a mixture of fiber such as natural pulp fiber or aramid fiber, filler such as diatomaceous earth, and a friction adjustment agent, dispersing the mixture in water to produce a slurry, and milling the slurry into paper, drying the paper to obtain a paper body, impregnating the paper body with the liquid phenol resin composition, and drying and curing the resin composition. The wet friction material thus obtained may be fabricated into a desired form such as a circular ring, as required. The binder in the wet friction material contains the resol-type phenol resin and the hydrolysis solution of an alkoxysilane or its condensate at a nonvolatile component ratio by weight of R/S=64/36 to 10/90. The nonvolatile components are components that do not volatilize when heated at 135° C. for one hour. The impregnation amount of the binder in the paper body is preferably 20 to 80 parts by weight for 100 parts by weight of the paper body on a dry basis.

The wet friction material thus obtained has a high coefficient of friction, exhibits only a minimal change in the total thickness, and exhibits an improved number of permanent cycles before delamination. The reason is as follows. Through the heat treatment in the process for manufacturing the wet friction material, the alkoxysilane hydrolysis solution is cured into a product having a siloxane bond with high flexibility and bending properties. Due to the nonvolatile component ratio in the range of 36 to 90 wt % in all nonvolatile components, the cured product increases the contact area of the wet friction material and the object to be adhered therewith, which is thought to give rise to an increased coefficient of friction. In addition, because the bonding energy of Si—O is significantly larger than the boding energy of C—C that forms the main skeleton of organic resins such as a phenol resin, introduction of siloxane bonds is thought to result in an increase in the number of permanent cycles before delamination of the wet friction material. On the other hand, the total thickness change of the wet friction material increases due to the high flexibility and bending properties of the siloxane bond. The total thickness change of the wet friction material can be maintained at the same level as that of the resol-type phenol resin by adding 64 to 10 wt % of the resol-type phenol resin which becomes cured by heating. The storage stability of the mixed solution of the alkoxysilane hydrolysis solution and the resol-type phenol resin is greatly affected by the pH of the solution. Adjusting the pH in an optimal range by the addition of an acid can ensure stable storage over a long period of time.

The wet friction material product of the present invention is made by causing the above wet friction material to adhere to one or both sides of a core material using an adhesive. Specific examples include a friction board consisting of a doughnut-shaped metallic core plate provided with a number of teeth around the inner or outer circumference and a circular ring made from the wet friction material attached to the both sides of the core plate, a break band made from a circular arc-shaped metallic thin plate with both ends being clamped with brackets and the wet friction material adhering in the inner side of the metallic thin plate, a lock-up clutch made from a core plate and the wet friction material adhering around the front cover side of the outer circumference of the core plate, and the like. As a means for causing the wet friction material to adhere to the core, a method of causing the same shape of the wet friction material as the core to adhere, a method of causing a circular ring of the wet friction material to adhere a disc-shaped core, a method of causing many pieces of the wet friction material in the shape of a square, sector, or circle, or non-specific shape to adhere at regular intervals, and the like can be given. Known adhesives can be used to cause the wet friction material to adhere to the cores.

EXAMPLES

The present invention will be described by way of Examples. In the description below, "parts" and "%" respectively mean "parts by weight" and "wt %".

Preparation of Phenol Resin 1

A flask equipped with a stirrer, a reflux condenser, and a thermometer was charged with 1000 parts of phenol and 863 parts of 37% formalin to make a solution with an A/P molar ratio of 1.0. After the addition of 38 parts of an aqueous solution of 20% sodium hydroxide, the mixture was reacted for one hour at 100° C. After dehydration under vacuum of 110 mmHg, the residue was heated to 70° C., whereupon 700 parts of methanol was added to obtain Phenol Resin 1 with an average molecular weight of 190 and containing 50% of nonvolatile components.

Preparation of Phenol Resin 2

A flask equipped with a stirrer, a reflux condenser, and a thermometer was charged with 1,000 parts of phenol and 1,035 parts of 37% formalin to make a solution with an A/P molar ratio of 1.2. After the addition of 38 parts of an aqueous solution of 20% sodium hydroxide, the mixture was reacted for one hour at 100° C. After dehydration under vacuum of 110 mmHg, the residue was heated to 70° C., whereupon 700 parts of methanol was added to obtain Phenol Resin 2 with an average molecular weight of 290 and containing 54% of nonvolatile components.

Preparation of Hydrolysis Solution 1

A flask equipped with a stirrer, a reflux condenser, and a thermometer was charged with 208 parts of tetraethoxysilane ("TZ-3161" manufactured by the Nippon Unicar Co., Ltd.), 150 parts of ethanol, 2 parts of 0.1 N hydrochloric acid, and 30 parts of purified water. The mixture was reacted for three hours at 40° C. to obtain Hydrolysis Solution 1. The content of nonvolatile components of the resulting solution after heat treatment for one hour at 135° C. was 26%.

Preparation of Hydrolysis Solution 2

A flask equipped with a stirrer, a reflux condenser, and a thermometer was charged with 180 parts of a tetraethoxysilane condensate ("Ethylsilicate 40" manufactured by Colcoat Co., Ltd.), 99 parts of methanol, 3 parts of 1 N hydrochloric acid, and 18 parts of purified water. The mixture was reacted for three hours at 30° C. to obtain Hydrolysis Solution 2. The content of nonvolatile components of the resulting solution after heat treatment for one hour at 135° C. was 34%.

Preparation of Hydrolysis Solution 3

A flask equipped with a stirrer, a reflux condenser, and a thermometer was charged with 152 parts of methyltrimethoxy silane ("A-163" manufactured by Nippon Unicar Co., Ltd.), 100 parts of methanol, 5 parts of 0.01 N hydrochloric acid, and 55 parts of purified water. The mixture was reacted for three hours at 40° C. to obtain Hydrolysis Solution 3. The content of nonvolatile components of the resulting solution after heat treatment for one hour at 135° C. was 25%.

Examples 1 to 6 and Comparative Examples 1 to 3

Resin compositions of Examples and Comparative Examples were prepared by mixing the Hydrolysis Solutions 1 to 3, Phenol Resins 1 to 2, and methanol, and heating the mixture at 135° C. for one hour to obtain mixtures with a nonvolatile component content of 30% and the weight ratio (R)/(S) of nonvolatile components shown in column (a) in Table 1. Conditions employed to produce the liquid resin compositions and their storage stability indicated by the number of days are shown in Table 1.

TABLE 1

| | (a) (R/S) | (b) | (c) | (d) | (e) | (f) | (g) |
|---|---|---|---|---|---|---|---|
| Example 1 | 60/40 | 1 | 2 | HCl | 3.1 | None | 50 or more |
| Example 2 | 20/80 | 1 | 1 | HCl | 3.1 | None | 50 or more |
| Example 3 | 20/80 | 1 | 2 | p-TSA* | 3.1 | None | 50 or more |
| Example 4 | 20/80 | 2 | 2 | HCl | 3.1 | None | 50 or more |
| Example 5 | 20/80 | 1 | 3 | HCOOH | 3.1 | None | 50 or more |
| Example 6 | 20/80 | 1 | 2 | p-TSA | 3.1 | 3% | 50 or more |
| Comparative Example 1 | 75/25 | 1 | 2 | HCl | 3.1 | None | 50 or more |
| Comparative Example 2 | 0/100 | 1 | 2 | None | 3.0 | None | 50 or more |
| Comparative Example 3 | 100/0 | 1 | None | None | 6.5 | None | 50 or more |

(a) The nonvolatile component ratio of the resol-type phenol resin (R) and the hydrolysis solution of an alkoxysilane and its condensate (S). The nonvolatile components are components that do not volatilize when heated at 135° C. for one hour.
(b) Type of resol-type phenol resin
(c) Type of hydrolysis solution
(d) Type of acid used for pH adjustment (*p-TSA: p-toluenesulfonic acid)
(e) pH of the resulting phenol resin composition (a 50% mixture with purified water at 25° C.)
(f) Silane coupling agent (Silane coupling agent of Example 6: γ-glycidoxypropyltrimethoxysilane)
(g) The number of days for which the resulting phenol resin composition could be stably stored (in a sealed container at 10° C.)

Examples 7 to 12 and Comparative Examples 4 to 6

Wet friction materials and wet friction boards were prepared using the liquid resin compositions obtained in Examples 1 to 6 and Comparative Examples 1 to 3 (Examples 7 to 12 and Comparative Examples 4 to 6 respectively corresponding to Examples 1 to 6 and Comparative Examples 1 to 3). Performance of the wet friction materials was evaluated using an SAE #2 friction tester. The evaluation conditions using the SAE #2 friction tester are shown in Table 2, and the results are shown in Table 3. The method of preparing the wet friction materials and wet friction boards will be described below. (Method of preparing the wet friction materials and wet friction boards)

Paper was prepared from a slurry consisting of 35% of natural pulp fiber, 20% of aramid fiber, and 45% of diatomaceous earths dispersed in water. The dry paper was impregnated with the liquid compositions obtained in the Examples and Comparative Examples, dried, and cured to obtain wet friction materials, each consisting of 100 parts of the paper body and 40 parts of the binder. The wet friction materials were fabricated into rings with an outer diameter of 130 mm and inner diameter of 100 mm. Next, the wet friction material rings were layered on the inner and outer side of a metallic ring with an outer diameter of 130 mm and an inner diameter of 100 mm, with the surface coated with an adhesive, and placed in a mold heated to 200° C. under a pressure of 4.903 Mpa or more for 30 seconds, thereby obtaining a wet friction board with a diameter of 130 mm and a thickness of 2.3 mm.

TABLE 2

| Measuring conditions of the coefficient of dynamic friction and total thickness change | Measuring conditions of the number of permanent cycles before delamination |
|---|---|
| Rotation: 3600 rpm | Rotation: 7600 rpm |
| Moment of inertia: 0.343 kg · m | Moment of inertia: 0.123 kg · m |
| Pressure on the surface: 785 kPa | Pressure on the surface: 519 kPa |
| Cycle number: 2,000 | |
| Temperature of oil: 100° C. | Temperature of oil: 100° C. |
| Amount of ATF: 700 ml/min | Amount of ATF: 360 ml/min |

TABLE 3

| | Coefficient of dynamic friction | Total thickness change (1m) | Number of permanent cycles before delamination |
|---|---|---|---|
| Example 7 | 0.13 | 29 | 20000 |
| Example 8 | 0.16 | 30 | 25000 |
| Example 9 | 0.16 | 30 | 30000 |
| Example 10 | 0.16 | 31 | 30000 |
| Example 11 | 0.16 | 29 | 30000 |
| Example 12 | 0.16 | 27 | 33000 |
| Comparative Example 4 | 0.12 | 29 | 8000 |
| Comparative Example 5 | 0.16 | 47 | 30000 |
| Comparative Example 6 | 0.12 | 30 | 8000 |

Total thickness change (1m) is indicated by the reduction of thickness of the wet friction material after the test.

As can be seen from the results of Table 3, the wet friction materials made from the phenol resin compositions prepared in the Examples are better than the wet friction material of Comparative Example 6, which was made from a conventional phenol resin composition, in terms of a high coefficient of friction, small total thickness change, and markedly large number of permanent cycles before delamination. In particular, the products of Examples 7 to 12 exhibited greatly improved characteristics in all tested items except for the total thickness change, for which the results of Examples 7 to 12 remained almost the same as those of the Comparative Example 6. The product of Example 12 made from the resin composition containing a silane coupling agent of Example 6 exhibited best results in all tested items. The product of Comparative Example 4 showed no improvement whatsoever in all tested items, including the coefficient of dynamic friction, total thickness change, and the number of permanent cycles before delamination. This is thought to be the results of too small an amount of the hydrolysis solution of alkoxysilane in the resin composition. The product of Comparative Example 5 showed inferior results in the total thickness change. The independent use of the hydrolysis solution of alkoxysilane may have strengthened the flexibility and bending properties characteristic to siloxane bonds in the cured product.

INDUSTRIAL APPLICABILITY

The liquid resin composition for wet friction material of the present invention can produce wet friction materials and fabricated products thereof exhibiting a high coefficient of friction, a small total thickness change, and a large number of permanent cycles before delamination, when the liquid resin composition is used as a binder for wet friction material. The resin composition therefore is an extremely useful industrial material as a binder for wet friction materials. The utility of the resin composition can be increased due to improved storage stability if the pH is adjusted to 2.0 to 4.5 with an acid.

What is claimed is:

1. A phenol resin composition for wet friction material comprising a curable resin composition obtained by mixing a resol-type phenol resin and a hydrolysis solution of an alkoxysilane or a condensate thereof, wherein the ratio (R/S) by weight of the nonvolatile components of the resol-type phenol resin (R) and the nonvolatile components of the hydrolysis solution of the alkoxysilane or the condensate thereof (S), obtained after heat-treatment at 135° C. for one hour, is in the range of 64/36 to 10/90.

2. The phenol resin composition for wet friction material according to claim 1, having a pH of 2.0 to 4.5.

3. The phenol resin composition for wet friction material according to claim 1, wherein the resol-type phenol resin is a resin having a number average molecular weight of 150 to 400 obtained by mixing a phenol compound (P) and an aldehyde compound (A) at a molar ratio of A/P=0.8 to 1.4.

4. The phenol resin composition for wet friction material according to claim 1, wherein the hydrolysis solution of an alkoxysilane or a condensate thereof is a hydrolysis solution obtained from an alkoxysilane having two or more hydrolyzable alkoxy groups in the molecule or a condensate thereof by hydrolysis with an acid in the presence of water and alcohol.

5. The phenol resin composition for wet friction material according to claim 1, further comprising at least one of silane coupling agents of the following formula (1) or its hydrolysis solution, $$Y\text{---}(CH_2)_n\text{---}SiX_2Z \tag{1}$$

wherein X is a methoxy group or an ethoxy group, Y represents an amino group, ureido group, mercapto group, aminoethylamino group, 2,3-epoxypropoxyl group, 3,4-epoxycyclohexyl group, or anilino group, Z is a methoxy group, ethoxy group, or methyl group, and n indicates an integer from 1 to 3.

6. A wet friction material comprising the phenol resin composition for wet friction material according to any one of claims 1 to 5 as a binder.

7. A fabricated object of a wet friction material prepared by causing the wet friction material of claim 6 to adhere to one or both sides of a core material using an adhesive.

* * * * *